(12) United States Patent
Gilbert et al.

(10) Patent No.: US 7,484,044 B2
(45) Date of Patent: Jan. 27, 2009

(54) METHOD AND APPARATUS FOR JOINT CACHE COHERENCY STATES IN MULTI-INTERFACE CACHES

(75) Inventors: Jeffrey D. Gilbert, Portland, OR (US); Kai Cheng, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 186 days.

(21) Appl. No.: 10/662,093

(22) Filed: Sep. 12, 2003

(65) Prior Publication Data

US 2005/0060499 A1    Mar. 17, 2005

(51) Int. Cl.
G06F 12/00    (2006.01)
G06F 13/00    (2006.01)

(52) U.S. Cl. .................. 711/144; 711/122; 711/145; 711/146; 711/136; 711/141; 711/142; 711/143

(58) Field of Classification Search ................ 711/144, 711/122, 145, 146, 136, 141, 142, 143
See application file for complete search history.

(56) References Cited

U.S. PATENT DOCUMENTS

| | | | | |
|---|---|---|---|---|
| 5,761,724 A | * | 6/1998 | Jhon et al. | 711/144 |
| 5,895,487 A | * | 4/1999 | Boyd et al. | 711/122 |
| 6,341,336 B1 | * | 1/2002 | Arimilli et al. | 711/144 |
| 6,629,268 B1 | * | 9/2003 | Arimilli et al. | 714/42 |
| 2002/0129211 A1 | * | 9/2002 | Arimilli et al. | 711/146 |
| 2003/0084248 A1 | | 5/2003 | Gaither et al. | |

FOREIGN PATENT DOCUMENTS

| | | |
|---|---|---|
| CN | 1231443 | 10/1999 |
| CN | 1414467 | 4/2003 |
| WO | WO 00/52582 | 9/2000 |

OTHER PUBLICATIONS

Architectural and Multiprocessor Design Verification of the PowerPC 604 Data Cache; Mar. 1995 pp. 383-388.*
European Patent Office, International Search Report and Written Opinion for International Application No. PCT/US2004/029687, 12 pages, Jun. 15, 2005.
PCT/US2004/029687 Int'l Preliminary Report on Patentability dated Mar. 23, 2006.

* cited by examiner

*Primary Examiner*—Jasmine Song
*Assistant Examiner*—Mardochee Chery
(74) *Attorney, Agent, or Firm*—Blakely, Sokoloff, Taylor & Zafman LLP

(57) ABSTRACT

A method and apparatus for cache coherency states is disclosed. In one embodiment, a cache accessible across two interfaces, an inner interface and an outer interface, may have a joint cache coherency state. The joint cache coherency state may have a first state for the inner interface and a second state for the outer interface, where the second state has higher privilege than the first state. In one embodiment this may promote speculative invalidation. In other embodiments this may reduce snoop transactions on the inner interface.

31 Claims, 9 Drawing Sheets

METHOD AND APPARATUS FOR JOINT CACHE COHERENCY STATES IN MULTI-INTERFACE CACHES

FIELD

The present disclosure relates generally to microprocessor systems, and more specifically to microprocessor systems capable of accessing caches across multiple interfaces.

BACKGROUND

In order to enhance the processing throughput of microprocessors, processors may hold data in a series of caches. To use these caches in a multi-processor environment, various cache-coherency protocols have evolved. These cache-coherency schemes may associate an attribute, called a cache-coherency state, with various cache lines in the caches. A common cache-coherency protocol is what may be called the "Illinois Protocol", also informally called the MESI (modified/exclusive/shared/invalid) protocol, where each cache line may be associated with one of the four MESI states. Other common cache-coherency protocols may include additional states. In this way, multiple copies of a given cache line, perhaps modified, may exist among the various caches in a multi-processor system in a predictable and coherent manner.

The existing MESI states may possess certain performance-limiting attributes. In one situation, when a modified cache line in a inner-level cache (e.g. level 1 cache) wishes to become invalid and write its modified data up to an outer-level cache (e.g. level 2 cache), the outer-level cache may in turn become invalid and write its modified data to an even more outer-level cache or to system memory. This may not be advantageous if there is significant traffic on the outer-level interfaces. In another situation, when a snoop request arrives at an outer-level cache, it must be sent down to any inner-level caches. This may not be advantageous if there is significant use of the inner-level caches over the inner-level interfaces.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The following description describes techniques for promoting coherency among the caches in a multi-processor environment. In the following description, numerous specific details such as logic implementations, software module allocation, bus signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. The invention is disclosed in the form of a processor, such as the Pentium 4® (class machine made by Intel® Corporation, that may use the Illinois or (in informally terminology) MESI (modified/exclusive/shared/invalid) cache-coherency protocol. However, the invention may be practiced in other forms of processors that use caches, and that may implement other forms of cache-coherency protocols. In some embodiments shown in the figures, interfaces shown between processors and their memories and caches may be shown as either busses or point-to-point interfaces. However, the invention may be practiced when the busses are replaced by point-to-point interfaces and when the point-to-point interfaces are replaced by busses.

Figure 1:
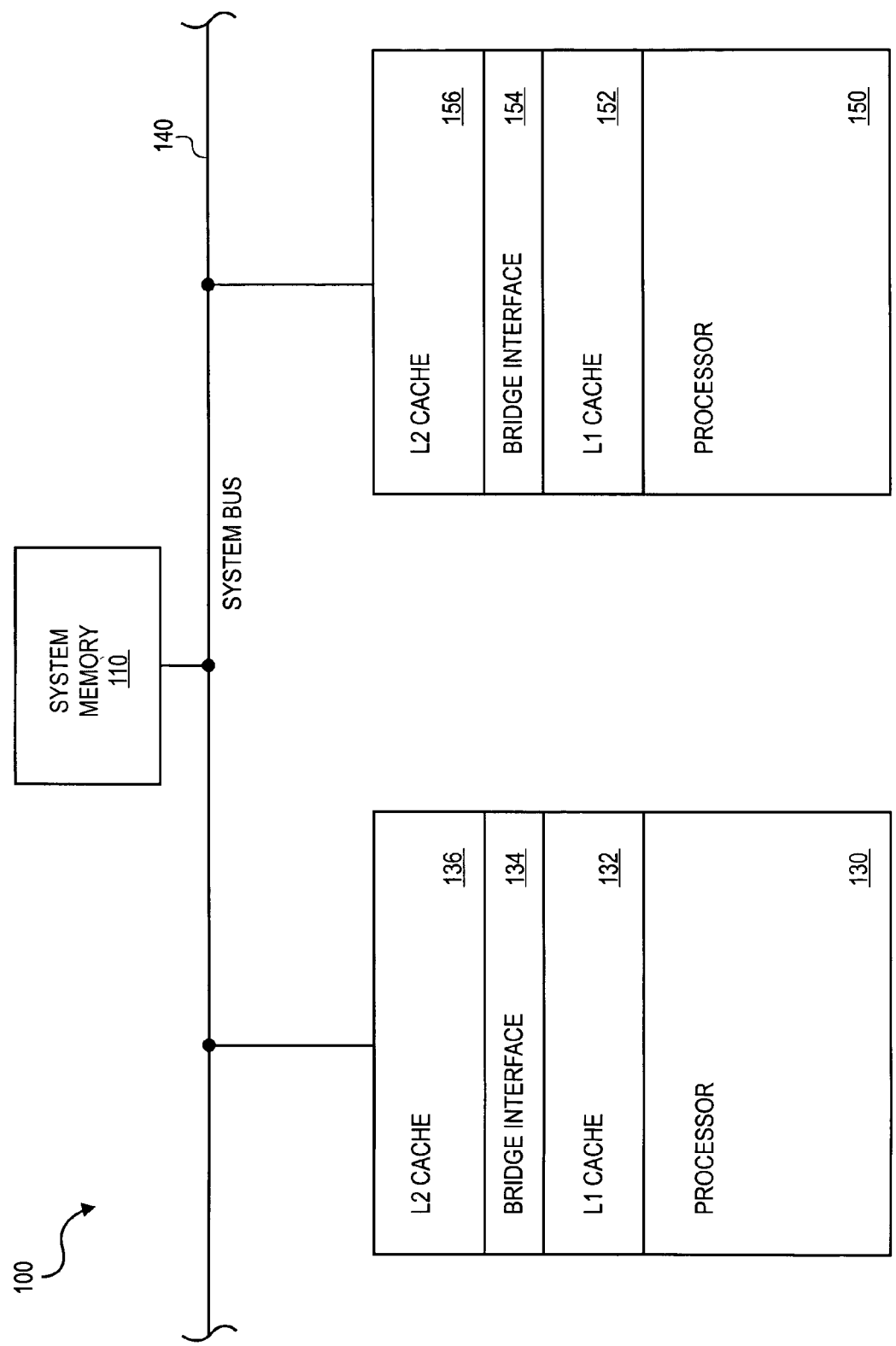
FIG. 1 is a schematic diagram of caches accessible over multiple interfaces, according to one embodiment.

Referring now to FIG. 1, a schematic diagram of caches accessible over multiple interfaces is shown, according to one embodiment. A multi-processor system 100 may include processors 130, 150, and system memory 110. In one embodiment, these may be connected with an interface that is a system bus 140. In other embodiments, other interfaces may be used, including point-to-point interfaces between processors 130, 150 and system memory 110. In one embodiment, inner-level caches such as L1 caches 132, 152 may be coupled to respective processors 130, 150. However, outer-level caches such as L2 caches 136, 156 may be coupled to two interfaces rather than to one interface and a processor. In the FIG. 1 embodiment, the interfaces to which L2 caches 136, 156 are coupled are system bus 140 and a bridge interface 134, 154, respectively.

When L1 cache 132 loads a cache line from L2 cache 136, the copy of the cache line in L1 cache 132 generally would take the cache coherency state that was associated with the cache line in L2 cache 136. For example, if the cache line in L2 cache 136 had a coherency state of E, then the copy of that cache line in L1 cache 132 would also have a coherency state of E. The copy of the cache line in L1 cache 132 would get the E state even though there was no intention of modifying the cache line. The more restrictive S state could be used by the L1 cache 132, but the E state is delivered nevertheless.

In another example, if a cache line in L2 cache 136 and the copy of that cache line in L1 cache 132 were in the M state, then if another cache wished to get that cache line in an E state both the cache line in L2 cache 136 and the copy of that cache line in L1 cache 132 would need to be changed to the I state in a sequential manner. This would require a relatively long period of time, and may interfere with the timing of other exchanges between the L1 cache 132 and the processor 130.

In order to more efficiently deal with the situations discussed in the preceding two paragraphs, in one embodiment the L2 cache 136 may exhibit a different cache coherency state when viewed from bridge interface 134 than from system bus 140. Such joint cache coherency states may exhibit behavior of traditional cache coherency states within the separate interfaces. Let a joint cache coherency state be denoted "AB" where "A" is the cache coherency state viewed from the outer interface (farther from the processor core) and "B" is the cache coherency state viewed from the inner interface (closer to the processor core). In one embodiment, if L2 cache 136 has a cache line in the ES state, then the L1 cache 132 may receive a copy of that cache line in the S state. This copy in the S state may be sufficient for the use by processor 130. And when another agent on the system bus 140, such as processor 150, desires to have that cache line in the S state, the snooping may stop at the L2 cache 136 because the copy of the cache line in the L1 cache 132 is already at the S state. This may enhance performance of transfers on the bridge interface 134 due to the reduced number of snoop transactions.

In another embodiment, consider L2 cache 136 and L1 cache 132 each having copies of a cache line in the M state. In those cases where the processor 130 will not perform any further modifications to the cache line, it may be advantageous to speculatively invalidate the cache line in the L1 cache 132 as opposed to waiting until a mandatory (or explicit, i.e. non-speculative) invalidation occurs at a later time. Therefore, in one embodiment the cache line in the L1 cache 132 may be speculatively invalidated to an I state but the copy of the cache line in the L2 cache 136 may be promoted to an MI state. In this manner the copy of the cache line in the L1 cache 132 is invalidated but the copy of the cache line in the L2 cache 136 may be retained in an M state from the point of view of an agent on the system bus 140. The eventual write-back of the modified cache line to system memory 110 from the L2 cache 136 may be postponed to enhance system performance. In other embodiments, the MI state may support instances of explicit invalidation as well.

Figure 2:
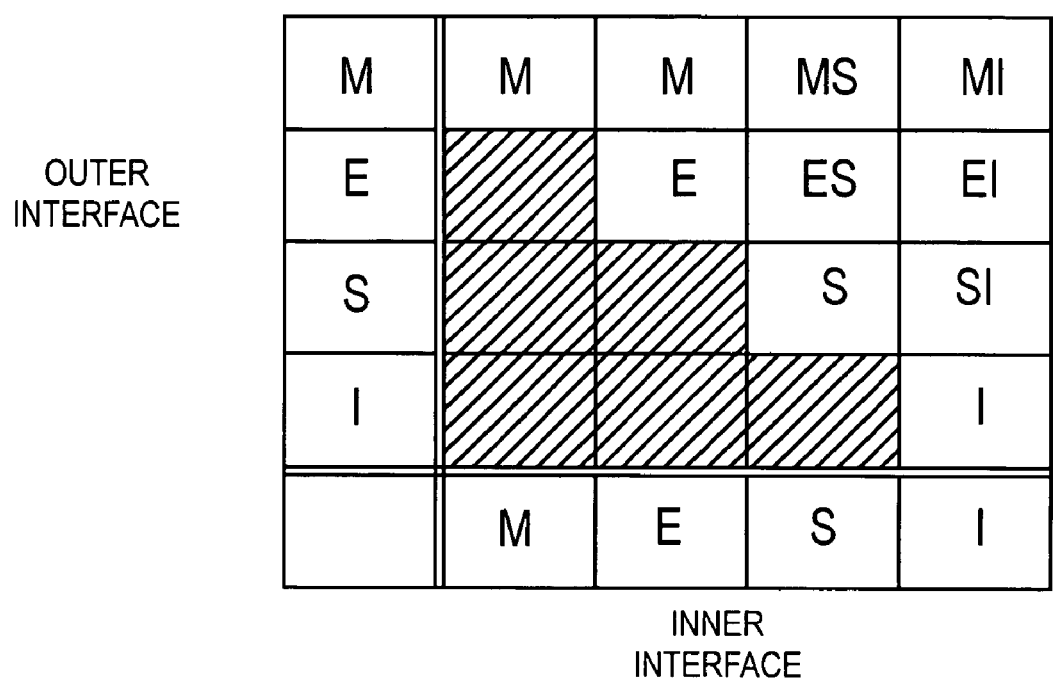
FIG. 2 is a chart showing joint cache coherency states, according to one embodiment.

Referring now to FIG. 2, a chart of joint cache coherency states is shown, according to one embodiment. The chart shows possible joint cache coherency states for a cache accessible by an inner interface and by an outer interface, but in various embodiments various sets of states from the chart may be implemented while other sets of states are not. In one embodiment, joint states exist for a cache line where the cache coherency state for the outer interface has an equal to or less restrictive privilege compared with the cache coherency state for the inner interface. For example, the two cache coherency states may be equal, giving the simple MESI cache states down the diagonal of the chart. But additionally there may be joint states where the cache coherency state of a cache line for the outer interface has a less restrictive privilege compared with the cache coherency state for the inner interface. In one embodiment, the cache coherency state of a cache line for the inner interface may be S, but the cache coherency state of that cache line for the outer interface may be E or even M. Similarly, in another embodiment the cache coherency state of a cache line for the inner interface may be I, but the cache coherency state of that cache line for the outer interface may be S, E, or even M.

One special case in the FIG. 2 chart is when the cache coherency state of the cache line is M for the outer interface but E for the inner interface. The chart identifies this joint state as simply an M state. This may be understood because the transition from E going to M is currently permitted without notification being given. For this reason a ME state is not required, and a simple M state may suffice.

One way of viewing the joint cache coherency states of FIG. 2 is that the inner interface state exhibits the maximum cache line state rights available at the inner levels of the caching hierarchy. In other words, the cache line state may be demoted—either silently or with notification given—at that inner level. It should be noted that demotions from the E and S states, such as E going to S, E going to I, or S going to I, may not require notice or data transfers to the outer levels of the caching hierarchy. However demotions from the M state may require that the outer levels in the caching hierarchy be given the modified data in a process that is sometimes called a writeback operation.

Figure 3A:
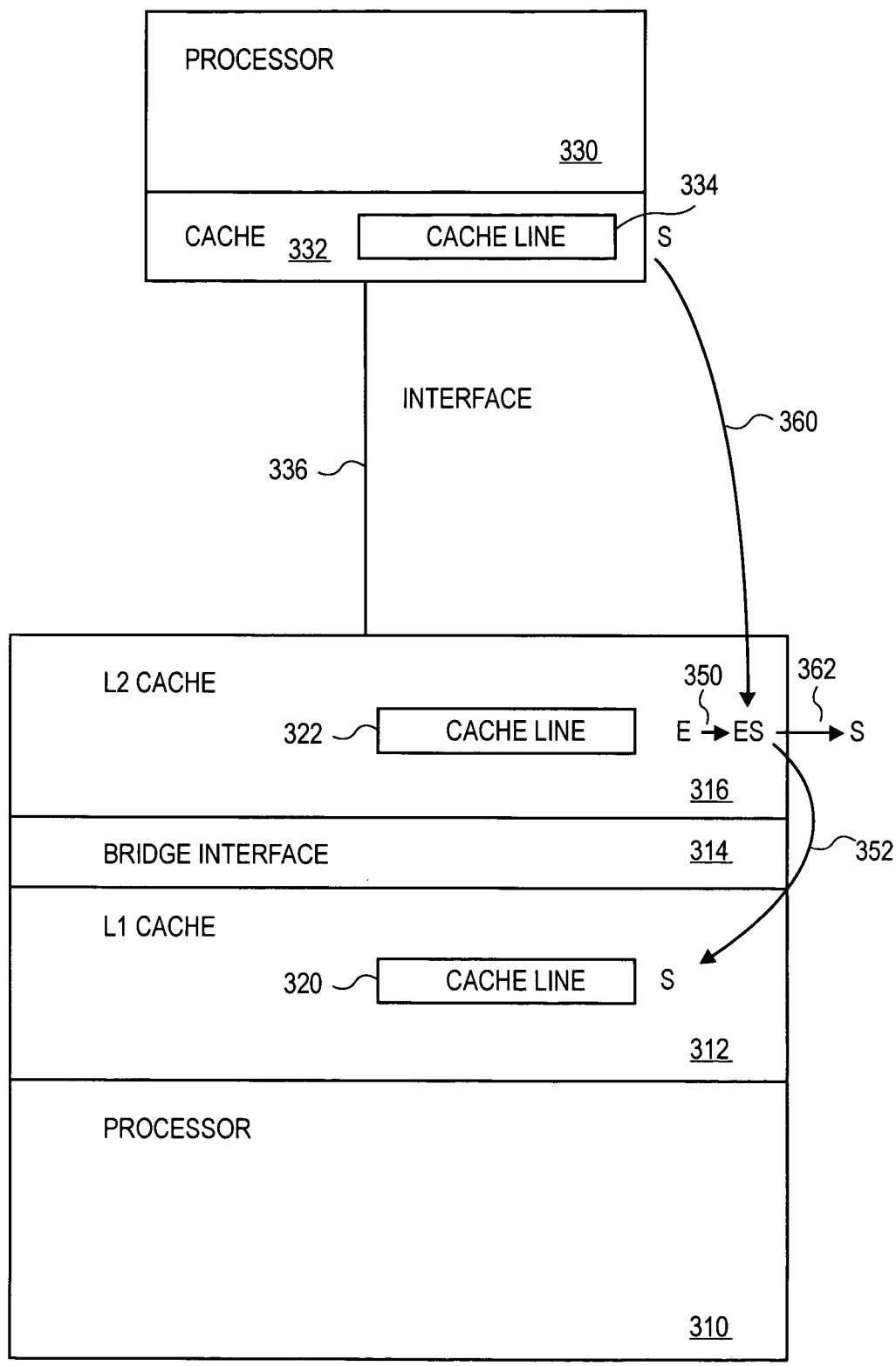
FIGS. 3A and 3B are diagrams showing operations with a cache in an exclusive-shared state, according to one embodiment of the present disclosure.

Referring now to FIG. 3A, a diagram of operations with a cache capable of operating in an exclusive-shared ES state is shown, according to one embodiment of the present disclosure. Initially a cache line 322 in L2 cache 316 may be in an E state. When a copy of the cache line is requested by L1 cache 312, the status of the cache line 322 may be promoted 350 to ES. Then a copy of the cache line 320 may be transferred to L1 cache 312 with state S.

The copy of the cache line 320 having state S may be advantageous if another cache desires that cache line. Consider a cache 332 at the far end of the outer interface 336 snooping to determine whether any other cache has a copy. When a snoop transaction 360 interrogates L2 cache 316, it may directly promote 362 the copy of the cache line 322 to S state because the copy of the cache line 320 in the L1 cache 312 is already at the S state. This makes unnecessary any further snooping transactions on bridge interface 314. Thus in this embodiment there is a reduction in snoop transactions on the inner interface.

In another embodiment, an ES cache line state may indicate that peer (and outer level caches) recognize that cache line as exclusively owned (i.e. as being in an exclusive or E state) by the cache with the ES line state. When a caching hierarchy has a cache line with an ES state at an inner level, outer level inclusive caches should carry that cache line with an E state.

In one embodiment, a cache line may acquire an ES state when the outer level grants exclusive access to the cache line but the inner level requested only shared access. Delivering shared cache line rights to the inner level while retaining knowledge that exclusive rights were granted may be considered added information that may be utilized for performance improvements.

In one embodiment, an ES state cache line should be snooped to either an S state or an I state for peer access to the cache line. The ES state may permit a snoop requesting a change to an S state to cause a very quick reduction in cache line state from ES to S without the need to snoop inner levels, as discussed above. This may be contrasted with an E state cache line that would have to issue an inner level snoop requesting a change to S state, and wait for the results, to maintain inclusion and coherence. The ES state may also help snoops requesting a change to an I state. These snoops should snoop inner levels to maintain coherence, but would not need to wait for snoop results. Correspondingly, an inner level request for exclusive access to an ES state cache line may be granted very quickly with the cache line state transitioning from an ES state to an E state.

Figure 3B:
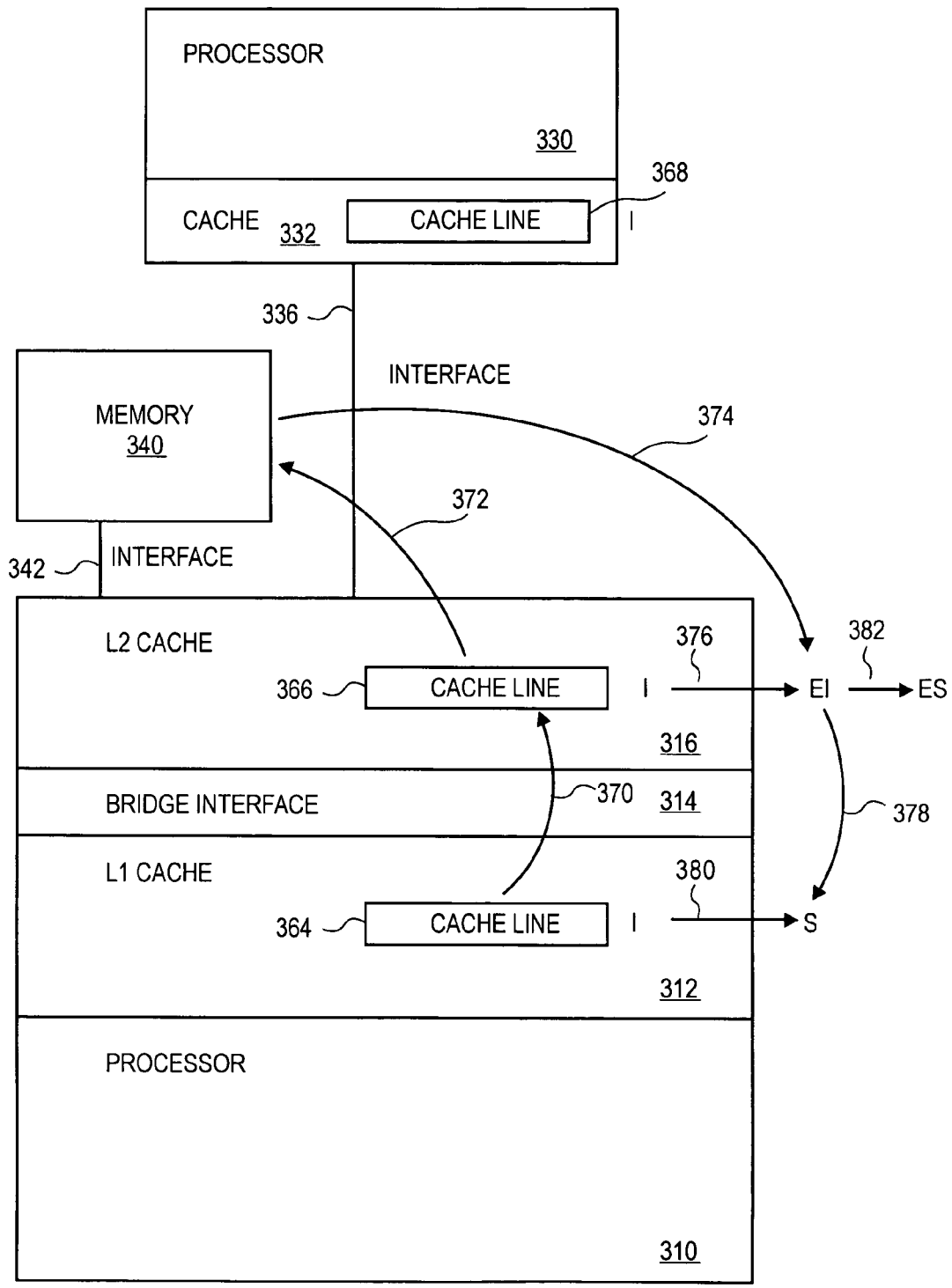

Referring now to FIG. 3B, a diagram of operations with a cache capable of operating in an exclusive-shared ES state is shown, according to another embodiment of the present disclosure. Initially a cache line 366 in L2 cache 316 and a cache line 364 in L1 cache 312 may be in an I state (i.e. neither cache holds a particular cache line in a valid state). When the processor 310 requests a copy of the cache line, it causes a cache miss in the L1 cache 312. Therefore the L1 cache 312 sends a request 370 for the cache line to L2 cache 316, where it again causes a cache miss but this time in L2 cache 316. If snooping reveals that other caches 332 do not have the cache line in a valid state, then L2 cache may send a further request 373 to system memory.

When the memory 340 transfers 374 the requested cache line to L2 cache 316, the newly resident cache line copy 366 may be promoted 376 from I state to EI state. When the L2 cache 316 then transfers 378 the cache line to L1 cache 312, the newly resident cache line copy 364 may be promoted 380 from I state to S state. When this happens the cache line 366 in L2 cache 316 may be further promoted 382 from EI state to ES state.

Figure 4:
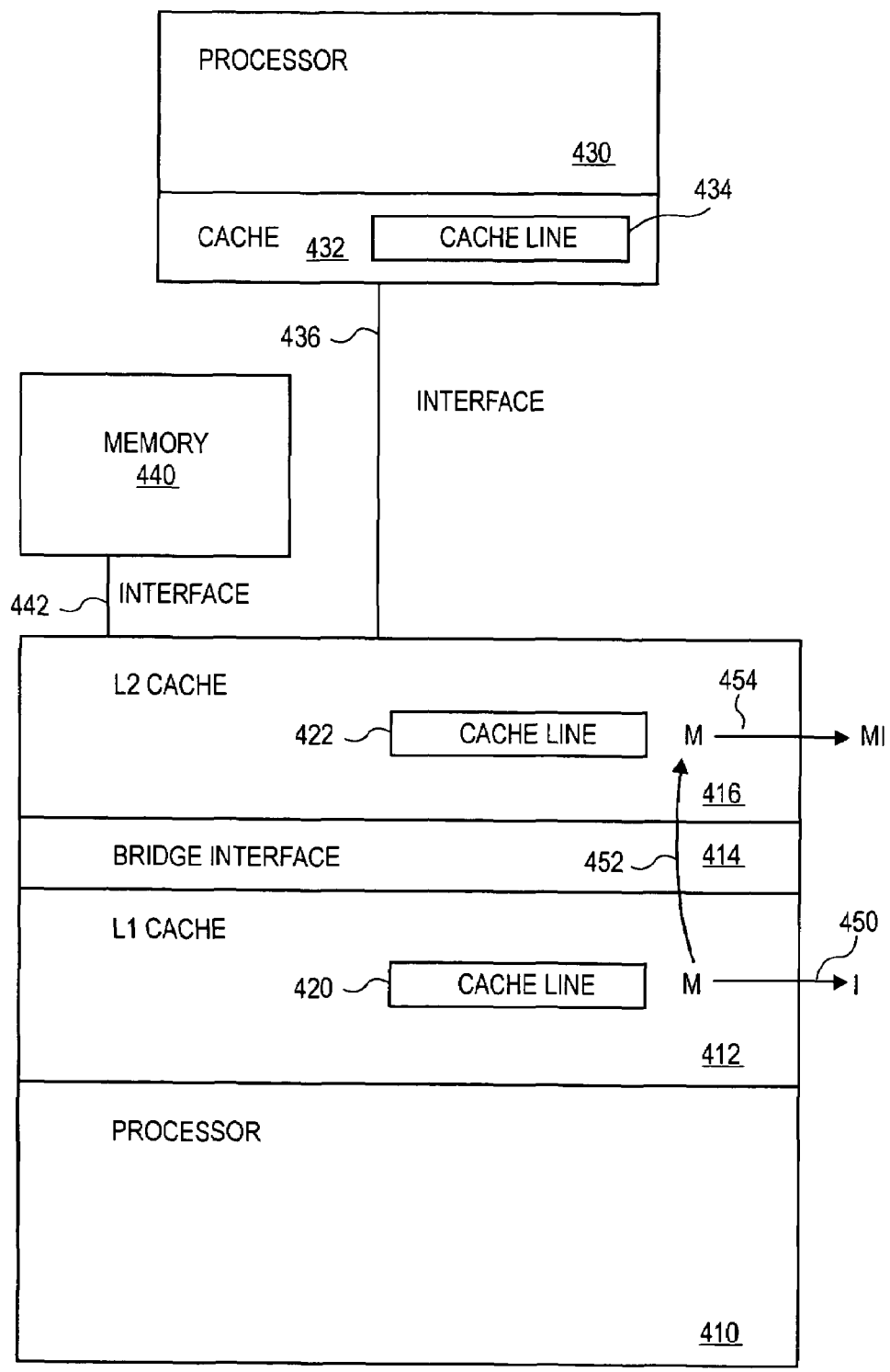
FIG. 4 is a diagram showing operations with a cache in a modified-invalid state, according to one embodiment of the present disclosure.

Referring now to FIG. 4, a diagram of operations with a cache capable of operating in a modified-invalid MI state is shown, according to one embodiment of the present disclosure. Initially, copies of cache line 420 in L1 cache 412 and cache line 422 in L2 cache 416 may be in an M state. When the L1 cache 412 determines that no future modifications or other uses of the copy of the cache line 420 may occur, it may elect to speculatively invalidate cache line 420. In one embodiment, this may occur by cache line 420 making a transition 450 from M to I state, and then sending the modified data 452 to cache line 422. At this time the cache line 422 may transition 454 from an M state to the MI state. In other embodiments, the MI state may support instances of explicit invalidation as well.

When cache line 422 is in an MI state, it may not need to immediately send the modified data in cache line 422 to memory 440. Instead, it may wait until the line is invalidated or evicted from the L2 cache 416 based upon a cache line replacement policy, such as the least-recently-used (LRU) policy, and send the modified data at that time. In other circumstances, cache line 422 when in an MI state may receive a snoop requesting a change to an I state. When this occurs, cache line 422 should quickly send the modified data to memory 440, but does not have to snoop down to cache line 420 in L1 cache 412 as it is already in an I state.

In one embodiment, an MI cache line state may indicate modified data in the L2 cache (along with exclusive ownership among peers) and may indicate that the cache line is not present in a valid state in any inner level cache. A cache line may reach an MI state as a consequence of receiving M state data from an inner level bus, followed or accompanied by notice that all copies of the cache line have been invalided in inner level caches. The notice may be a voluntary notice of a cache line replacement (often referred to as a "capacity eviction" or an explicit writeback operation), or because of injecting an invalidation transaction. An MI state may also result from an MS state cache line receiving notice that all inner level caches have invalidated their copies of the cache line. Retaining information that the cache line is not present in a valid state in any inner level cache obviates the need to snoop inner level caches to service incoming outer level snoops. Holding on to M state data allows rapid delivery of the current data to caching levels that most recently modified the data (a temporal locality optimization).

In one embodiment, an MI state cache line should be snooped to either an S state or an I state for peer access to the cache line. In both cases, an immediate 'modified data' response may be issued with effectively instant availability of that modified data, both without the need to snoop inner levels. This contrasts with an M state cache line that should issue an inner level snoop, and then wait for the results, to maintain inclusion and coherence and, possibly, to obtain current data. Correspondingly, an inner level request for access to an MI state cache line may be granted quickly. The cache line state may be transitioned to M for an exclusive access request from an inner level or to MS for a shared access request from an inner level.

Figure 5:
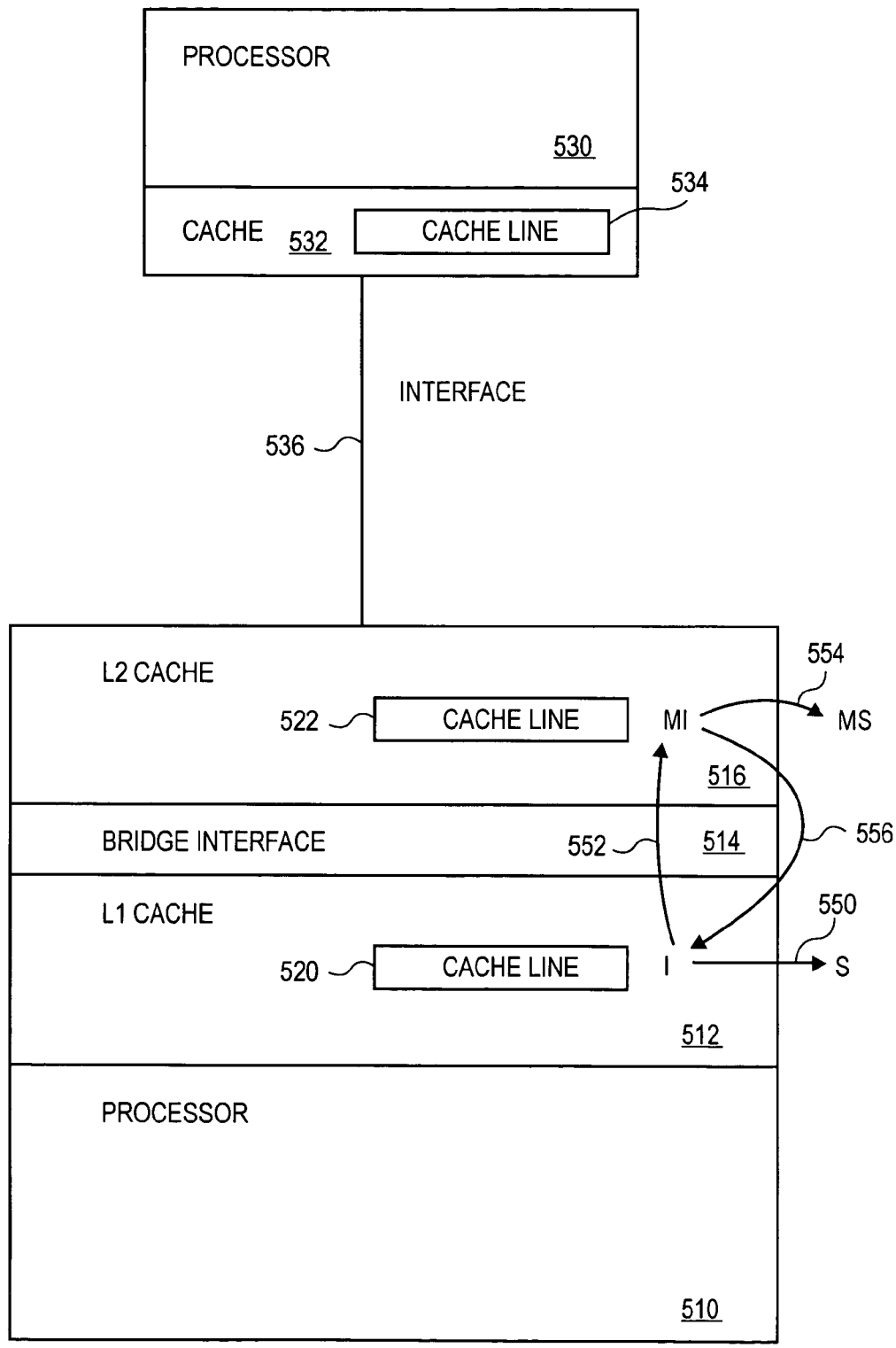
FIG. 5 is a diagram showing operations with a cache in a modified-shared state, according to one embodiment of the present disclosure.

Referring now to FIG. 5, a diagram of operations with a cache capable of operating in a modified-shared MS state is shown, according to one embodiment of the present disclosure. In the FIG. 5 embodiment, initially the cache line 520 in L1 cache 512 may be at an I state while the cache line 522 in the L2 cache 516 may be at an MI state. The cache line 520 may wish to re-read the modified data in cache line 522. Therefore a request 552 may be sent to L2 cache 516, causing it to transfer 556 the modified data to the L1 cache 512 and then have the cache line 522 transition 554 from an MI state to an MS state. Another transition 550 then may occur taking cache line 520 from an I state to an S state.

In one embodiment, an MS cache line state may indicate modified data in the L2 cache (along with exclusive ownership among peers) and may indicate that the cache line may be in an S state in an inner level cache. A cache line may reach an MS state as a consequence of an inner level request for shared access hitting an MI state line, as discussed above. Alternatively, an MS state may result from receiving M state data from an inner level bus followed with (or accompanied by) notice that all copies of the cache line have been demoted to S state (or invalided) in all inner level caches. Retaining information that the cache line is not modified in any inner level cache obviates the need to snoop inner level caches for current data. Holding on to M state data allows rapid delivery of current data to caching levels that most recently modified the data along with rights to modify that data (another temporal locality optimization).

In one embodiment, an MS state cache line may be snooped to an S state for peer access to the cache line. In this case, a contemporaneous 'modified data' response may be issued with rapid availability of that modified data, without the need to wait for the inner level snoop to complete. Thus in this particular embodiment there is a reduction in snoop transactions on the inner interface. This contrasts with an M state cache line that should issue an inner level snoop, and then wait for the results, to maintain inclusion and coherence and, possibly, to obtain current data. Correspondingly, an inner level request for access to an MS state cache line may be granted very quickly. The cache line state may be transitioned to M for an exclusive access request from an inner level, or the cache line state may stay in MS state for a shared access request from an inner level.

Figure 6:
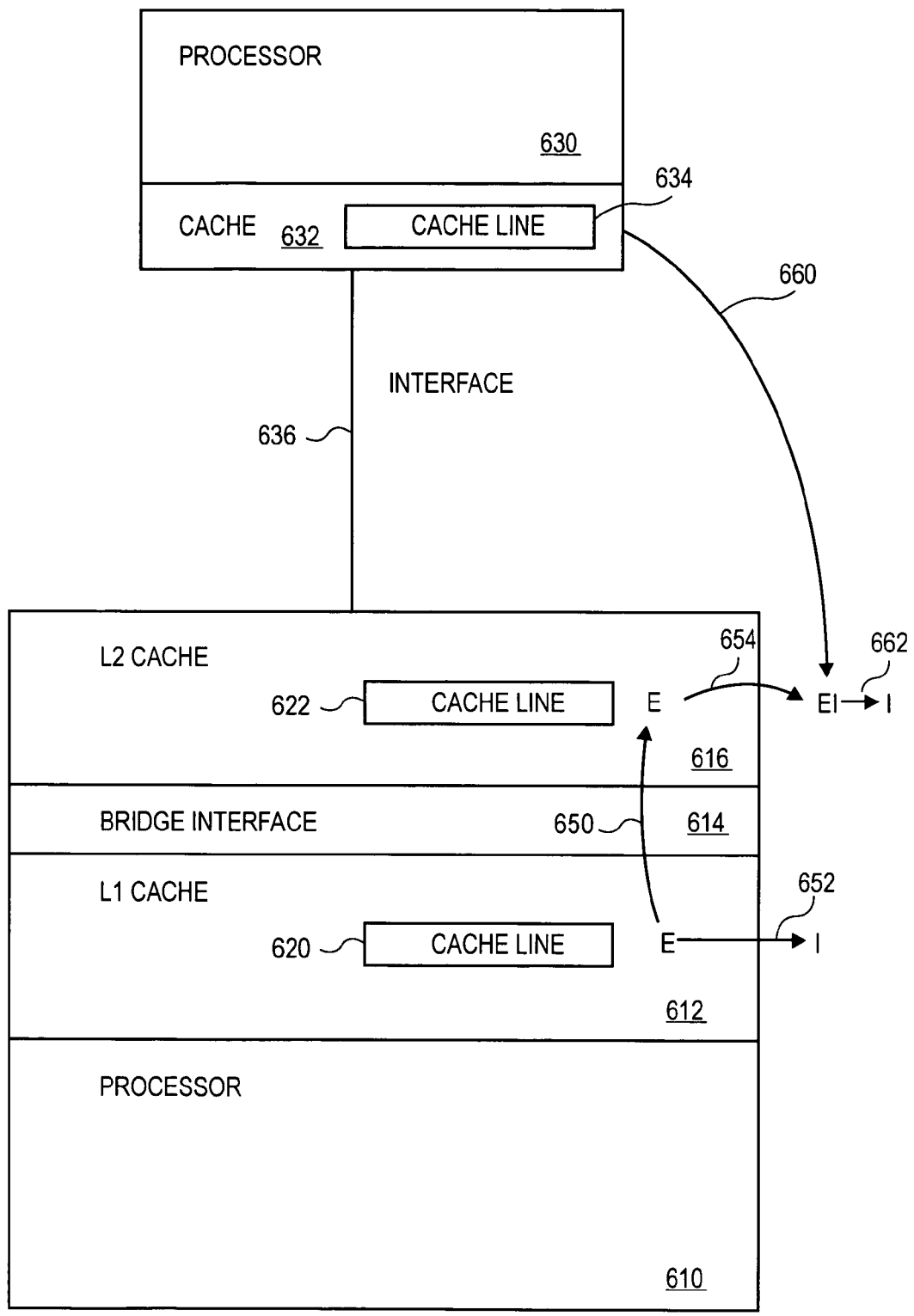
FIG. 6 is a diagram showing operations with a cache in an exclusive-invalid state, according to one embodiment of the present disclosure.

Referring now to FIG. 6, a diagram of operations with a cache capable of operating in an exclusive-invalid EI state is shown, according to one embodiment of the present disclosure. In the FIG. 6 embodiment, consider initially cache line 620 in L1 cache 612 and cache line 622 in L2 cache 616 being in the E state. If L1 cache 612 determines that cache line 620 should be invalidated speculatively, then a request 650 may be sent to L2 cache 616, and a transition 654 may take cache line 622 from the E state to an EI state. At the same time, a transition 652 may take cache line 620 from the E state to the I state. In other embodiments, the EI state may support instances of explicit invalidation as well.

If another cache, such as cache 632, desires a copy of the cache line 632 in an E state, it may send a snoop 660 that may initiate a transition 662 that may take cache line 622 from the EI state to the I state. The snoop 660 may not need to be sent on to the L1 cache 612 as the copy of the cache line 620 is already known to be in the I state. Thus in this embodiment there is a reduction in snoop transactions on the bridge interface 614.

In one embodiment, an EI cache line state may indicate exclusive ownership of the cache line in the L2 cache and may indicate that the cache line is not in any inner level cache. A cache line may reach an EI state as a consequence of an E state or an ES state cache line receiving notice that all copies of the cache line have been invalided in inner level caches. Retaining information that the cache line is not in a valid state in any inner level cache obviates the need to snoop inner level caches. Holding on to E state allows rapid delivery of current data along with granting of E state or S state access to the inner level.

In one embodiment, an EI state cache line should be snooped to either an SI state, an S state, or an I state for peer access to the cache line. An incoming request for exclusive access to an EI state line results in a rapid 'clean' response to the snoop, while transitioning the cache line to an I state without the need to snoop inner levels. The case of an incoming request for shared access to an EI state line requires a policy decision: either retain the line by indicating an immediate 'hit' response to the snoop while transitioning the cache line to SI state or S state, or remove by eviction the EI state line and signal a 'clean' snoop result (neither policy requires snooping inner levels). These sequences contrast with an E state cache line that should issue an inner level snoop, and then wait for the results, in order to maintain inclusion and coherence and, possibly, to obtain current data. Correspondingly, an inner level request for access to an EI state cache line may be granted very quickly. The cache line state may be transitioned to E for an exclusive access request from an inner level, or to ES for a shared access request from an inner level.

Figure 7:
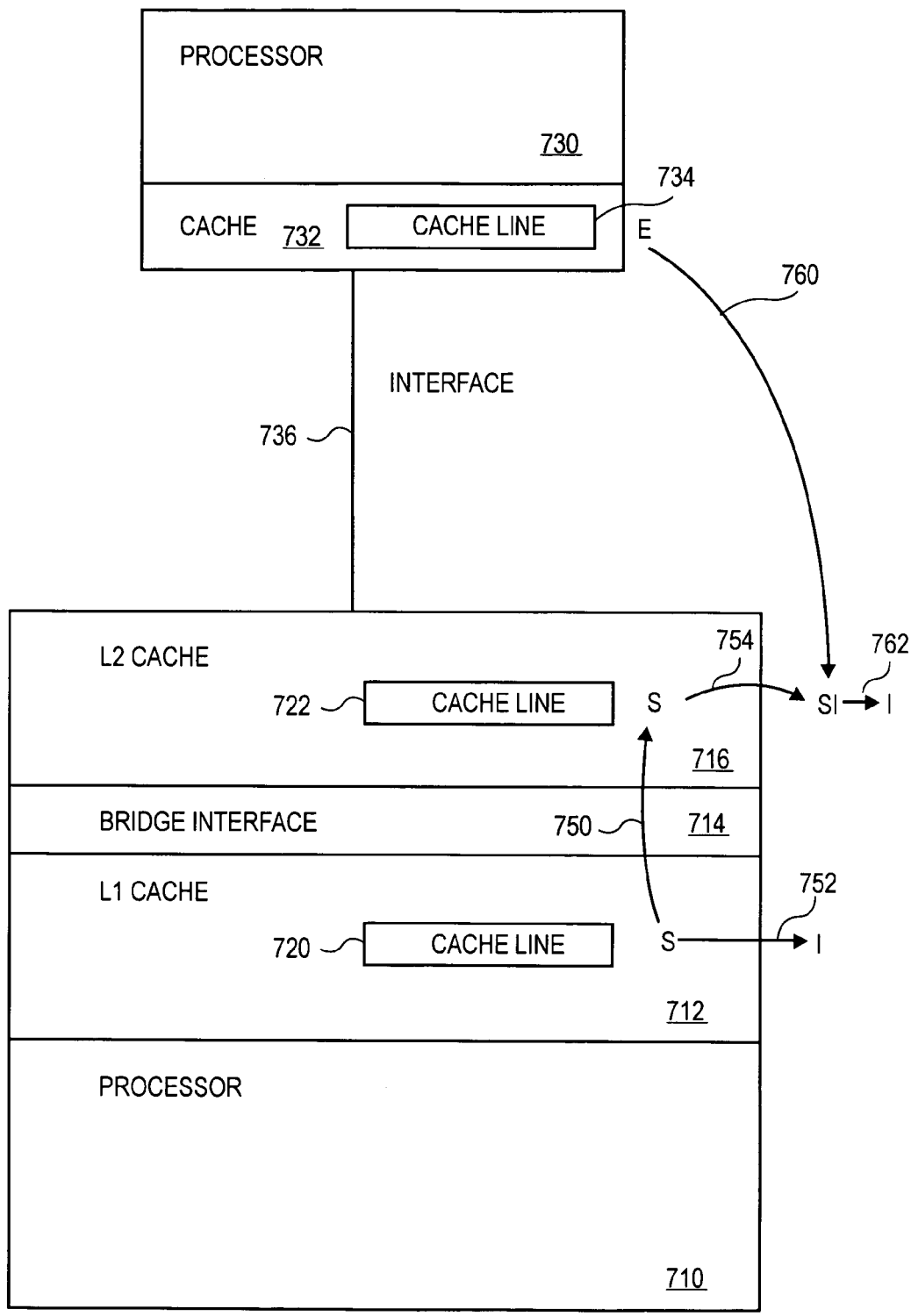
FIG. 7 is a diagram showing operations with a cache in a shared-invalid state, according to one embodiment of the present disclosure.

Referring now to FIG. 7, a diagram of operations with a cache capable of operating in a shared-invalid SI state is shown, according to one embodiment of the present disclosure. In the FIG. 7 embodiment, consider initially cache line 720 in L1 cache 712 and cache line 722 in L2 cache 716 being in the S state. If L1 cache 712 determines that cache line 720 should be invalidated speculatively, then a request 750 may be sent to L2 cache 716, and a transition 754 may take cache line 722 from the S state to an SI state. At approximately the same time, a transition 752 may take cache line 720 from the S state to the I state. In other embodiments, the SI state may support instances of explicit invalidation as well.

If another cache, such as cache 732, desires a copy of the cache line 734 in an E state, it may send a snoop 760 that may initiate a transition 762 that may take cache line 722 from the SI state to the I state. The snoop 760 may not need to be sent on to the L1 cache 712 as the copy of the cache line 720 is already known to be in the I state. Thus in this embodiment there is a reduction in snoop transactions on the bridge interface 714.

In one embodiment, an SI cache line state may indicate shared data in the L2 cache and may indicate that the cache line is not in any valid state in any inner level cache. A cache line may reach SI state as a consequence of an S state line receiving notice that all copies of the cache line have been invalided in inner level caches. Retaining information that the cache line is not in any inner level cache obviates the need to notify inner level caches when servicing incoming snoops. Holding on to S state allows rapid delivery of current data along with granting of S state access to the inner level. An incoming request for exclusive access to an SI state line may result in a rapid 'clean' response to the snoop while transitioning the cache line to I state without the need to snoop inner levels. This sequence is in contrast with an S state cache line that should issue an inner level snoop. An incoming request for shared access to an SI state is handled equivalently to an S state: it results in a rapid 'hit' response with no change in the SI cache line state.

Figure 8:
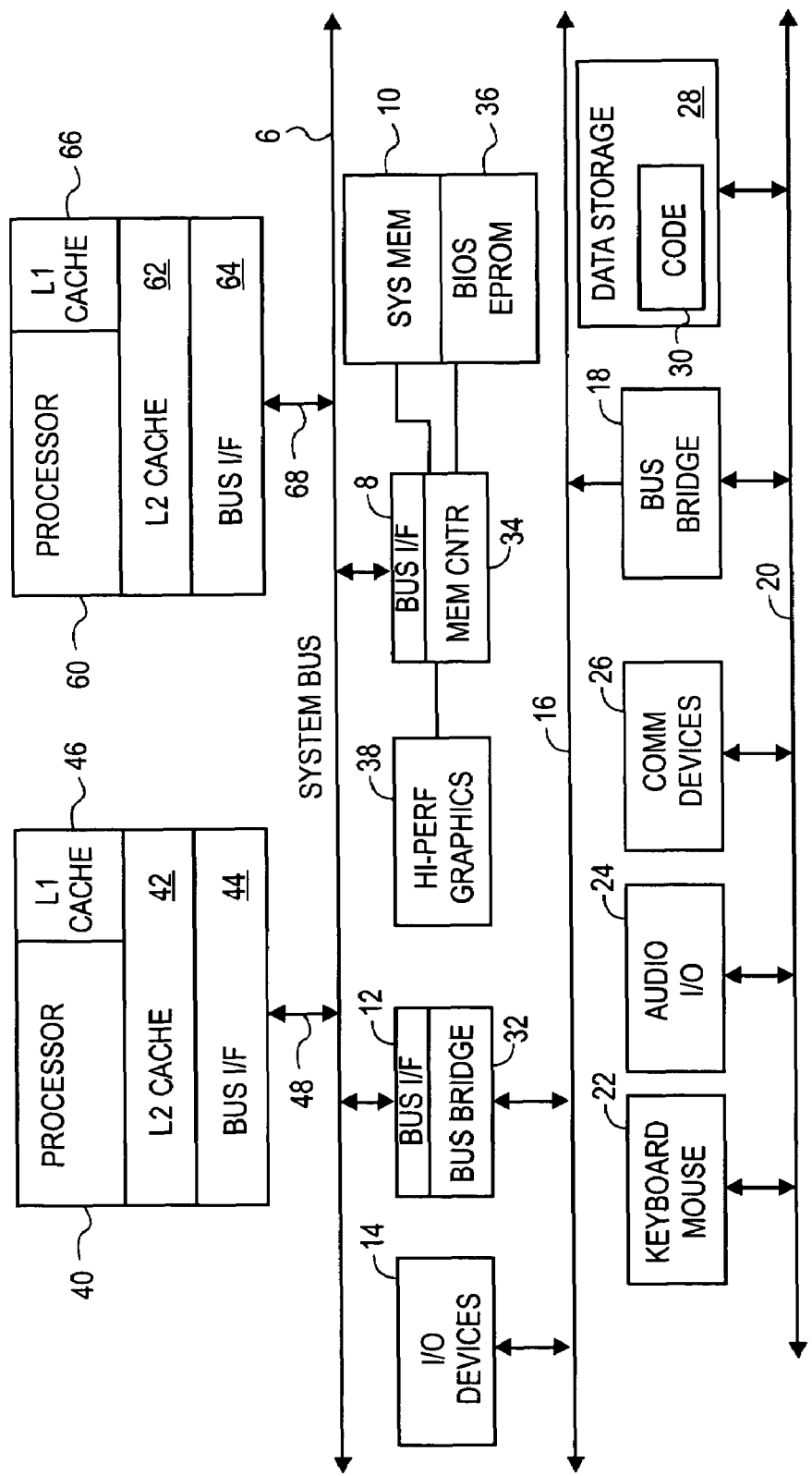
FIG. 8 is a schematic diagram of a processor system, according to one embodiment of the present disclosure.

Referring now to FIG. 8, a schematic diagram of a processor system is shown, according to one embodiment of the present disclosure. The FIG. 8 system may include several processors of which only two, processors 40, 60 are shown for clarity. Processors 40, 60 may be the processor 130 of FIG. 1, including the cache configuration of FIG. 1. Processors 40, 60 may include L1 caches 46, 66 and L2 caches 42, 62. The FIG. 8 multiprocessor system may have several functions connected via bus interfaces 44, 64, 12, 8 with a system bus 6. In one embodiment, system bus 6 may be the front side bus (FSB) utilized with Pentium 4® class microprocessors manufactured by Intel® Corporation. A general name for a function connected via a bus interface with a system bus is an "agent". Examples of agents are processors 40, 60, bus bridge 32, and memory controller 34. In some embodiments memory controller 34 and bus bridge 32 may collectively be referred to as a chipset. In some embodiments, functions of a chipset may be divided among physical chips differently than as shown in the FIG. 8 embodiment.

Memory controller 34 may permit processors 40, 60 to read and write from system memory 10 and from a basic input/output system (BIOS) erasable programmable read-only memory (EPROM) 36. In some embodiments BIOS EPROM 36 may utilize flash memory. Memory controller 34 may include a bus interface 8 to permit memory read and write data to be carried to and from bus agents on system bus 6. Memory controller 34 may also connect with a high-performance graphics circuit 38 across a high-performance graphics interface 39. In certain embodiments the high-performance graphics interface 39 may be an advanced graphics port AGP interface, or an AGP interface operating at multiple speeds such as 4× AGP or 8× AGP. Memory controller 34 may direct read data from system memory 10 to the high-performance graphics circuit 38 across high-performance graphics interface 39.

Bus bridge 32 may permit data exchanges between system bus 6 and bus 16, which may in some embodiments be a industry standard architecture (ISA) bus or a peripheral component interconnect (PCI) bus. There may be various input/output I/O devices 14 on the bus 16, including in some embodiments low performance graphics controllers, video controllers, and networking controllers. Another bus bridge 18 may in some embodiments be used to permit data exchanges between bus 16 and bus 20. Bus 20 may in some embodiments be a small computer system interface (SCSI) bus, an integrated drive electronics (IDE) bus, or a universal serial bus (USB) bus. Additional I/O devices may be connected with bus 20. These may include keyboard and cursor control devices 22, including mice, audio I/O 24, communications devices 26, including modems and network interfaces, and data storage devices 28. Software code 30 may be stored on data storage device 28. In some embodiments, data storage device 28 may be a fixed magnetic disk, a floppy disk drive, an optical disk drive, a magneto-optical disk drive, a magnetic tape, or non-volatile memory including flash memory.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
  a first interface;
  a second interface not directly coupled to said first interface; and
  a cache accessible from said first interface and said second interface, to contain a cache line, the cache line having a joint cache coherency state wherein the cache line has a first cache coherency state when accessed from said first interface and a second cache coherency state when accessed from said second interface, wherein said first cache coherency state has higher privilege than said second cache coherency state when said second interface is coupled to a processor.

2. The apparatus of claim 1, wherein said second cache coherency state is to reduce snoop transactions on said second interface.

3. The apparatus of claim 2, wherein said second cache coherency state supports speculative invalidation.

4. The apparatus of claim 3, wherein said first cache coherency state is modified and said second cache coherency state is invalid.

5. The apparatus of claim 3, wherein said first cache coherency state is exclusive and said second cache coherency state is invalid.

6. The apparatus of claim 3, wherein said first cache coherency state is shared and said second cache coherency state is invalid.

7. The apparatus of claim 3, wherein said second cache coherency state further supports explicit invalidation.

8. The apparatus of claim 1, wherein said first cache coherency state is exclusive and said second cache coherency state is shared.

9. The apparatus of claim 1, wherein said first cache coherency state is modified and said second cache coherency stare is shared.

10. A method, comprising:
associating a first cache coherency state with a first cache line in a first cache, said first cache coherency state being a single cache coherency state, said first cache coupled to a first interface and to a second interface;
associating a second cache coherency state with a second cache line in a second cache coupled to said first cache via said second interface;
transitioning said first cache coherency state to a joint cache coherency state including said first cache coherency state for said first interface and a third cache coherency state for said second interface; and
transitioning said second cache coherency state to said third cache coherency state.

11. The method of claim 10, wherein said first cache coherency state is exclusive, said second cache coherency state is invalid, and said third cache coherency state is shared.

12. The method of claim 10, wherein said first cache coherency state is modified, said second cache coherency state is modified, and said third cache coherency state is invalid.

13. A method, comprising:
associating a first cache coherency state with a first cache line in a first cache, said first cache coherency state being a single cache coherency state, said first cache coupled to a first interface and to a second interface;
associating a second cache coherency state with a second cache line in a second cache coupled to said first cache via said second interface;
transitioning said second cache coherency state to an invalid state; and
transitioning said first cache coherency state to a joint cache coherency state including said first cache coherency state for said first interface and an invalid state for said second interface.

14. The method of claim 13, wherein said first cache coherency state is modified.

15. The method of claim 13, wherein said first cache coherency state is exclusive.

16. The method of claim 13, wherein said first cache coherency state is shared.

17. A method, comprising:
associating a first cache coherency state with a first cache line in a first cache, said first cache coherency state being a single cache coherency state, said first cache coupled to a first interface and to a second interface;
associating an invalid state with a second cache line in a second cache coupled to said first cache via said second interface;
transitioning said invalid state to a shared state; and
transitioning said first cache coherency state to a joint cache coherency state including a shared state for said second interface.

18. The method of claim 17, wherein said first cache coherency state is invalid and said joint cache coherency state is exclusive-shared.

19. The method of claim 17, wherein said first cache coherency state is modified-invalid and said joint cache coherency state is modified-shared.

20. An apparatus, comprising:
means for associating a first cache coherency state with a first cache line in a first cache, said first cache coherency state being a single cache coherency state, said first cache coupled to a first interface and to a second interface;
means for associating a second cache coherency state with a second cache line in a second cache coupled to said first cache via said second interface;
means for transitioning said first cache coherency state to a joint cache coherency state including said first cache coherency state for said first interface and a third cache coherency state for said second interface; and
means for transitioning said second cache coherency state to said third cache coherency state.

21. The apparatus of claim 20, wherein said first cache coherency state is exclusive, said second cache coherency state is invalid, and said third cache coherency state is shared.

22. The apparatus of claim 20, wherein said first cache coherency state is modified, said second cache coherency state is modified, and said third cache coherency state is invalid.

23. An apparatus, comprising:
means for associating a first cache coherency state with a first cache line in a first cache, said first cache coherency state being a single cache coherency state, said first cache coupled to a first interface and to a second interface;
means for associating a second cache coherency state with a second cache line in a second cache coupled to said first cache via said second interface;
means for transitioning said second cache coherency state to an invalid state; and
means for transitioning said first cache coherency state to a joint cache coherency state including said first cache coherency state for said first interface and an invalid state for said second interface.

24. The apparatus of claim 23, wherein said first cache coherency state is modified.

25. The apparatus of claim 23, wherein said first cache coherency state is exclusive.

26. The apparatus of claim 23, wherein said first cache coherency state is shared.

27. An apparatus, comprising:
   means for associating a first cache coherency state with a first cache line in a first cache, said first cache coherency state being a single cache coherency state, said first cache coupled to a first interface and to a second interface;
   means for associating an invalid state with a second cache line in a second cache coupled to said first cache via said second interface;
   means for transitioning said invalid state to a shared state; and
   means for transitioning said first cache coherency state to a joint cache coherency state including a shared state for said second interface.

28. The apparatus of claim 27, wherein said first cache coherency state is invalid and said joint cache coherency state is exclusive-shared.

29. The apparatus of claim 27, wherein said first cache coherency state is modified-invalid and said joint cache coherency state is modified-shared.

30. A system, comprising:
   a cache accessible from a first interface and a second interface, to contain a cache line, the cache line having a joint cache coherency state wherein the cache line has a first cache coherency state when accessed from said first interface and a second cache coherency state when accessed from said second interface, wherein said first cache coherency state has higher privilege than said second cache coherency state when said second interface is coupled to a processor;
   a bus bridge to a third interface; and
   an input-output device coupled to said third interface.

31. The system of claim 30, wherein said second cache coherency state is to reduce snoop transactions on said second interface.

* * * * *

UNITED STATES PATENT AND TRADEMARK OFFICE
CERTIFICATE OF CORRECTION

PATENT NO. : 7,484,044 B2  Page 1 of 1
APPLICATION NO. : 10/662093
DATED : January 27, 2009
INVENTOR(S) : Gilbert et al.

It is certified that error appears in the above-identified patent and that said Letters Patent is hereby corrected as shown below:

In column 9, at line 26 delete, "stare" and insert --state--.

Signed and Sealed this

Nineteenth Day of October, 2010

David J. Kappos
*Director of the United States Patent and Trademark Office*